US011787153B2

(12) United States Patent
Bourgeois

(10) Patent No.: US 11,787,153 B2
(45) Date of Patent: Oct. 17, 2023

(54) THERMALLY LAMINATED TAB LINER

(71) Applicant: Tekni-Plex, Inc., Wayne, PA (US)

(72) Inventor: Philip D. Bourgeois, Perrysburg, OH (US)

(73) Assignee: Tekni-Plex, Inc., Wayne, PA (US)

( * ) Notice: Subject to any disclaimer, the term of this patent is extended or adjusted under 35 U.S.C. 154(b) by 656 days.

(21) Appl. No.: 15/906,609

(22) Filed: Feb. 27, 2018

(65) Prior Publication Data

US 2018/0186122 A1 Jul. 5, 2018

Related U.S. Application Data

(63) Continuation-in-part of application No. 15/091,607, filed on Apr. 6, 2016, now Pat. No. 11,148,400.

(51) Int. Cl.
*B32B 37/10* (2006.01)
*B32B 37/04* (2006.01)
(Continued)

(52) U.S. Cl.
CPC .............. *B32B 7/06* (2013.01); *B29C 65/18* (2013.01); *B29C 65/368* (2013.01);
(Continued)

(58) Field of Classification Search
CPC .. B32B 7/06; B32B 7/05; B32B 27/08; B32B 27/32; B32B 27/302; B32B 27/36; B32B 27/306; B32B 15/20; B32B 15/085; B32B 2305/34; B32B 37/206; B32B 37/0076; B32B 37/10; B32B 37/04; B32B 38/04; B32B 2305/345; B32B 2307/31; B32B 2307/306; B32B 2323/10; B32B 2323/046; B32B 2329/04; B32B 2325/00; B32B 2367/00; B32B 2435/02; B32B 2038/042; B32B 2311/24; B29C 66/7392; B29C 65/7461; B29C 66/73921; B29C 66/72321; B29C 66/433; B29C 66/83413; B29C 66/114; B29C 66/24221; B29C 66/8322; B29C 66/53461; B29C 65/368; B29C 66/1122; B29C 66/112; B29C 66/43;
(Continued)

(56) References Cited

U.S. PATENT DOCUMENTS 2,937,481 A    5/1960   Palmer
3,963,845 A * 6/1976   Dukess ................ B65D 41/045
                                                                                    428/66.4

(Continued)

OTHER PUBLICATIONS

Int'l. Search Report and Written Opinion dated Jun. 21, 2017 in corresponding Int'l. Appln. No. PCT/US2017/024774.

*Primary Examiner* — Christopher W Raimund
(74) *Attorney, Agent, or Firm* — Polsinelli, P.C.

(57) ABSTRACT

Liner having an induction heat sealable layer for sealing to a rim of a container, and a pull tab for ease of removal of the liner from the container rim. An insert is disposed between multilayer upper and lower components, has a heat bondable polyolefin layer that is thermally laminated to polyolefin layers of the upper and lower components, forming a pull tab between the integrated polyolefin layers. The resulting composite resists delamination and can be formed in a single thermal lamination step, avoiding the multiple lamination steps, associated high equipment costs, and complex layer constructions of the prior art.

16 Claims, 11 Drawing Sheets

(51) Int. Cl.
| | |
|---|---|
| *B32B 38/04* | (2006.01) |
| *B29L 31/56* | (2006.01) |
| *B29K 701/12* | (2006.01) |
| *B29K 705/02* | (2006.01) |
| *B29L 31/00* | (2006.01) |
| *B32B 7/06* | (2019.01) |
| *B32B 27/08* | (2006.01) |
| *B32B 27/32* | (2006.01) |
| *B32B 27/30* | (2006.01) |
| *B32B 27/36* | (2006.01) |
| *B32B 15/20* | (2006.01) |
| *B29C 65/18* | (2006.01) |
| *B29C 65/76* | (2006.01) |
| *B29C 65/00* | (2006.01) |
| *B65D 53/04* | (2006.01) |
| *B65D 77/20* | (2006.01) |
| *B65D 51/18* | (2006.01) |
| *B32B 15/085* | (2006.01) |
| *B32B 7/05* | (2019.01) |
| *B65D 51/20* | (2006.01) |
| *B65D 41/04* | (2006.01) |
| *B29C 65/74* | (2006.01) |
| *B29C 65/36* | (2006.01) |
| *B32B 37/20* | (2006.01) |
| *B32B 37/00* | (2006.01) |

(52) U.S. Cl.
CPC ...... *B29C 65/3656* (2013.01); *B29C 65/7461* (2013.01); *B29C 65/76* (2013.01); *B29C 66/004* (2013.01); *B29C 66/112* (2013.01); *B29C 66/114* (2013.01); *B29C 66/1122* (2013.01); *B29C 66/24221* (2013.01); *B29C 66/43* (2013.01); *B29C 66/433* (2013.01); *B29C 66/45* (2013.01); *B29C 66/53461* (2013.01); *B29C 66/71* (2013.01); *B29C 66/723* (2013.01); *B29C 66/72321* (2013.01); *B29C 66/7392* (2013.01); *B29C 66/73113* (2013.01); *B29C 66/73921* (2013.01); *B29C 66/7422* (2013.01); *B29C 66/8322* (2013.01); *B29C 66/83413* (2013.01); *B32B 7/05* (2019.01); *B32B 15/085* (2013.01); *B32B 15/20* (2013.01); *B32B 27/08* (2013.01); *B32B 27/302* (2013.01); *B32B 27/306* (2013.01); *B32B 27/32* (2013.01); *B32B 27/36* (2013.01); *B65D 41/045* (2013.01); *B65D 51/18* (2013.01); *B65D 51/20* (2013.01); *B65D 53/04* (2013.01); *B65D 77/2024* (2013.01); *B29C 66/7352* (2013.01); *B29C 66/73713* (2013.01); *B29C 2793/009* (2013.01); *B29C 2793/0018* (2013.01); *B29C 2793/0081* (2013.01); *B29K 2701/12* (2013.01); *B29K 2705/02* (2013.01); *B29L 2031/565* (2013.01); *B29L 2031/712* (2013.01); *B32B 37/0076* (2013.01); *B32B 37/04* (2013.01); *B32B 37/10* (2013.01); *B32B 37/206* (2013.01); *B32B 38/04* (2013.01); *B32B 2038/042* (2013.01); *B32B 2305/34* (2013.01); *B32B 2305/345* (2013.01); *B32B 2307/306* (2013.01); *B32B 2307/31* (2013.01); *B32B 2311/24* (2013.01); *B32B 2323/046* (2013.01); *B32B 2323/10* (2013.01); *B32B 2325/00* (2013.01); *B32B 2329/04* (2013.01); *B32B 2367/00* (2013.01); *B32B 2435/02* (2013.01); *B65D 2251/0015* (2013.01); *B65D 2251/0093* (2013.01); *B65D 2577/205* (2013.01)

(58) Field of Classification Search
CPC ... B29C 66/004; B29C 65/3656; B29C 65/18; B29C 65/76; B29C 66/45; B29C 66/71; B29C 66/723; B29C 66/73113; B29C 66/7422; B29C 2793/0081; B29C 2793/009; B29C 66/7352; B29C 66/73713; B29C 2793/0018; B65D 51/20; B65D 41/045; B65D 53/04; B65D 77/2024; B65D 51/18; B65D 2251/0093; B65D 2577/205; B65D 2251/0015; B29K 2705/02; B29K 2701/12; B29L 2031/712; B29L 2031/565
See application file for complete search history.

(56) References Cited

U.S. PATENT DOCUMENTS

| | | |
|---|---|---|
| 4,224,379 A | 9/1980 | Ichinose et al. |
| 4,801,647 A | 1/1989 | Wolfe |
| 4,960,216 A | 10/1990 | Giles et al. |
| 4,961,986 A | 10/1990 | Galda et al. |
| 5,217,790 A | 6/1993 | Galda et al. |
| 5,231,990 A | 11/1993 | Galda et al. |
| 5,402,015 A | 3/1995 | Hammermann |
| 5,433,992 A | 7/1995 | Galda et al. |
| 5,514,442 A | 5/1996 | Galda et al. |
| 5,679,201 A * | 10/1997 | Gardiner ............ B32B 7/02 156/310 |
| 5,702,015 A | 12/1997 | Giles et al. |
| 6,082,566 A | 7/2000 | Yousif et al. |
| 6,312,776 B1 | 11/2001 | Finkelstein et al. |
| 6,378,715 B1 | 4/2002 | Finkelstein et al. |
| 6,461,714 B1 | 10/2002 | Giles |
| 6,886,926 B2 | 5/2005 | Kaga et al. |
| 6,902,075 B2 | 6/2005 | O'Brien et al. |
| 7,217,454 B2 | 5/2007 | Smelko et al. |
| 7,419,559 B2 | 9/2008 | Giles |
| 7,648,764 B2 | 1/2010 | Yousif |
| 8,057,896 B2 | 11/2011 | Smelko |
| 8,080,118 B2 | 12/2011 | Yousif |
| 8,100,277 B1 * | 1/2012 | Bush ............ B65D 77/2024 215/305 |
| 8,329,288 B2 | 12/2012 | Allegaert et al. |
| 8,348,082 B2 | 1/2013 | Cain |
| 8,404,352 B2 | 3/2013 | Schwab et al. |
| 2004/0071934 A1 | 4/2004 | Giles |
| 2006/0151541 A1 | 7/2006 | Smelko et al. |
| 2006/0172143 A1 * | 8/2006 | Breese ............ C08L 23/0853 428/500 |
| 2008/0233339 A1 | 9/2008 | William |
| 2008/0286576 A1 * | 11/2008 | McGuire, Jr. ......... B29C 51/28 428/412 |
| 2009/0078671 A1 | 3/2009 | Triquet et al. |
| 2011/0100989 A1 | 5/2011 | Cain |
| 2012/0028016 A1 | 2/2012 | Zuercher et al. |
| 2015/0197385 A1 | 7/2015 | Wei |
| 2018/0079576 A1 | 3/2018 | Cassidy |

* cited by examiner

THERMALLY LAMINATED TAB LINER

FIELD OF THE INVENTION

The present invention relates to an induction heat-sealable liner for sealing to a rim of a container and to a method of its fabrication.

BACKGROUND OF THE INVENTION

Heat-sealable liners are induction heat sealed to the entire periphery of the rim of a container (also referred to as a neck finish or container mouth), thereby isolating the container contents from the exterior environment. There are two general methods of applying a heat seal liner, depending on whether it is applied alone (a one element liner) or in combination with a backing liner (a two element liner). To apply a one element liner, the liner is punched from a sheet of heat seal liner material, inserted into a closure, the closure is screwed onto the neck of a (previously filled) container, and the closure is then passed under a heat sealer that bonds (via induction heating) the liner to the rim of the container. For a two element liner, the combined liner is punched from a sheet of material that combines both the heat seal liner and backing liner layers, inserted into a closure, the closure is screwed onto the container, and the closure is passed under a heat sealer that both induction heat seals the heat-sealable liner to the rim and melts a layer (e.g., wax) between the heat seal liner and backing liner so that when the user removes the closure, the backing liner remains in the closure.

In various embodiments, the role of a heat-sealable liner is to render the container tamper proof, as well as provide a barrier between the contents and the exterior environment, e.g., for protecting drugs, medicine, or food packaged in the container. The secondary backing liner, which remains in the cap, provides a secondary tightness (barrier to the exterior) insofar as the heat seal liner has been partly or fully removed.

One type of heat-sealable liner includes a pull tab to facilitate removal of the liner from the mouth of the container. Generally, providing a pull tab greatly increases the complexity of the liner construction and its manufacturing process and cost. Some designs require use of a release coating to enable separation of a layer that becomes the tab. There are typically multiple lamination steps, and associated equipment required, resulting in high capital and manufacturing costs. In many cases, the tab acts as a point of failure, e.g., the tab ruptures or disconnects from the remaining liner portions before rupture of the induction heat seal bond with the mouth of the container.

It would thus be desirable to provide a simplified heat seal liner construction that can be more easily and inexpensively manufactured, while also providing the necessary barrier functionality and strength, e.g., to resist delamination of the liner or rupture of the pull tab while separating the liner from the mouth of the container.

SUMMARY OF THE INVENTION

Liner having an induction heat sealable layer for sealing to a rim of a container, and a pull tab for ease of removal of the liner from the container rim.

In one embodiment, an insert is disposed between multilayer upper and lower components, having a heat bondable polyolefin layer that is thermally laminated to polyolefin layers of the upper and lower components, forming the integrated polyolefin layers and a pull tab. The resulting composite resists delamination and can be formed in a single thermal lamination step, avoiding the multiple lamination steps, associated high equipment costs, and complex layer constructions of the prior art.

In accordance with various embodiments of the invention, the liner has a three part construction, formed from an upper multilayer component, a lower multilayer component, and a multi-layer folded insert disposed in one area between the upper and lower components. In a first area of the liner the upper and lower components are thermally laminated together without the folded insert therebetween, forming a first non-separable liner portion. In contrast, the folded insert is disposed between a second area of the upper and lower components to form a second liner portion that includes a pull tab.

The materials and construction of the various liner components, namely the upper component, lower component, and folded insert, have been simplified for ease of manufacture. The liner includes a pull tab that resists delamination from the remainder of the liner when a user, grasping the pull tab, pulls the tab (and integral liner) away from the rim of the container in order to rupture the induction heat seal bond between the liner and the rim. The various liner materials permit thermal lamination between the upper and lower components, and between the upper component, the folded insert, and lower component, in the second and first liner portions respectively, by the application of heat and pressure, without bonding the inner separable layer of the folded insert so as to form the pull tab. The pull tab, extending via a hinged fold line from an upwardly facing side of the liner (opposite the downwardly facing side that bonds to the rim), similarly resists thermal bonding during the induction heat sealing process for applying the liner to the container rim.

In accordance with one embodiment of the invention there is provided a liner comprising:

three stacked multilayer components thermally laminated together to form a composite liner, the liner having an induction heat sealable lower layer for sealing to a rim of a container and a pull tab for ease of removal of the liner from the rim of the container, the three multilayer components comprising:

an upper multilayer component (UMC) comprising an upper support layer and a lower heat bondable polyolefin layer; and a lower multilayer component (LMC) comprising an upper heat bondable polyolefin layer, the lower induction heat sealable layer, and an inductive heating layer therebetween;

a folded insert comprising upper and lower multilayer insert portions joined at a fold line, each insert portion comprising an outer heat bondable polyolefin layer and an inner heat resistant separable layer wherein in a folded position the inner separable layers of the insert portions are facing one another and resist bonding by thermal lamination and induction heating to form the pull tab in the liner, the liner being formed by a method comprising:

in a first area of the liner the UMC and LMC polyolefin layers are disposed facing one another and are thermally laminated by application of heat and pressure to form an integral polyolefin layer of a non-separable first liner portion; and in a second area of the liner the polyolefin layers of the upper and lower insert portions are disposed facing the UMC and LMC polyolefin layers respectively and thermally laminated, by application of heat and pressure, to form integral polyolefin layers in a second liner portion having the pull tab.

In such an embodiment, the folded insert is formed from a multilayer tube or sheet comprising the heat bondable polyolefin layer and the heat resistant separable layer, the folded insert formed by a method comprising:

radially collapsing the tube or folding the sheet to form the fold line and insert portions on opposite sides of the fold line.

In such an embodiment, the liner has a substantially circular perimeter and the fold line intersects and extends across the circular perimeter at a length equal to or less than a diameter of the circular perimeter.

In such an embodiment, the support layer is formed from one or more of polyethylene terephthalate, polyamide, polyethylene naphthalate, polypropylene, or any combination thereof.

In such an embodiment, the folded insert is formed from a multilayer tube, the tube having an outer tube layer comprising the outer polyolefin layer of the insert, and the tube having an inner layer comprising the separable layer of the insert, the tube being collapsed to form the fold line and cut to form a folded tube portion that comprises the folded insert.

In such an embodiment the liner is punched from a thermally laminated web of the three multilayer components.

In such an embodiment the polyolefin layers of the liner are thermally laminated by at least partially melting the adjacent polyolefin layers.

In such an embodiment the polyolefin layers of the liner are formed from at least one of an ethylene-based polymer and a propylene-based polymer.

In such an embodiment the ethylene-based polymer is an ethylene-alpha olefin copolymer and the propylene-based polymer is a propylene-alpha olefin copolymer.

In such an embodiment the polyolefin layers of the liner are formed from at least one of ethylene vinyl acetate (EVA) based polymers, ethylene-methyl acrylate (EMA) based polymers, and ethylene-ethyl acrylate (EEA) based polymers.

In such an embodiment the polyolefin layers of the liner comprise polypropylene, polyethylene, and copolymers and blends thereof.

In such an embodiment the inductive heating layer comprises a metal foil layer.

In such an embodiment the multiplayer components are formed by one or more of extrusion, co-extrusion, extrusion coating, extrusion lamination, and dry bond lamination.

In accordance with one embodiment of the invention there is provided a method of forming a liner comprising:
thermally laminating together three stacked multi-layer components to form a composite liner, the liner having an induction heat sealable lower layer for sealing to a rim of a container and a pull tab for ease of removal of the liner from the rim of the container, the three multi-layer components comprising:
  an upper multilayer component (UMC) comprising an upper support layer and a lower heat bondable polyolefin layer; and
  a lower multilayer component (LMC) comprising an upper heat bondable polyolefin layer, the lower induction heat sealable layer, and an inductive heating layer therebetween;
  a folded polymer insert comprising upper and lower multilayer insert portions joined at a fold line, each insert portion comprising an outer heat bondable polyolefin layer and an inner heat resistant separable layer wherein in a folded position the inner separable layers of the two insert portions are facing one another and resist bonding by thermal lamination and induction heating to form the pull tab in the liner, wherein the method includes:
disposing a first area of the UMC and LMC polyolefin layers facing one another,
disposing the folded insert between a second area of the UMC and LMC polyolefin layers with the polyolefin layers of the upper and lower insert portions disposed facing the UMC and LMC polyolefin layers respectively, and
forming a non-separable first liner portion by thermally laminating the facing polyolefin layers in the first area by application of heat and pressure to form an integral polyolefin layer, and
forming a second liner portion having the pull tab by thermally laminating the facing polyolefin layers in the second area by application of heat and pressure to form integral polyolefin layers in the second liner portion.

In such an embodiment the polyolefin layers of the liner are formed from at least one of an ethylene-based polymer and a propylene-based polymer.

In such an embodiment the ethylene-based polymer is an ethylene-alpha olefin copolymer and the propylene-based polymer is a propylene-alpha olefin copolymer.

In such an embodiment the polyolefin layers are formed from at least one of ethylene vinyl acetate (EVA) based polymers, ethylene-methyl acrylate (EMA) based polymers, and ethylene-ethyl acrylate (EEA) based polymers.

In such an embodiment the polyolefin layers comprise polypropylene, polyethylene, and copolymers and blends thereof.

In such an embodiment the folded insert is formed from a multilayer tube or sheet comprising the heat bondable polyolefin layer and the heat resistant separable layer, the folded insert formed by a method comprising:
radially collapsing the tube or folding the sheet to form the fold line and insert portions on opposite sides of the fold line.

In such an embodiment the multilayer components are formed by one or more of extrusion, co-extrusion, extrusion coating, extrusion lamination, and dry bond lamination.

In such an embodiment the method comprises:
providing the stacked three multilayer components; and
forming the integral polyolefin layers in a single thermal laminating step.

In such an embodiment the UMC is formed, prior to the thermal laminating step, by one or more of extrusion, co-extrusion, extrusion coating, extrusion lamination, and dry bond lamination.

In such an embodiment the LMC is formed, prior to the thermal laminating step, by one or more of extrusion, co-extrusion, extrusion coating, extrusion lamination, and dry bond lamination.

In such an embodiment the folded insert is formed from a multilayer tube or sheet comprising the heat bondable polyolefin layer and the heat resistant separable layer, the folded insert formed by a method comprising:
radially collapsing the tube or folding the sheet to form the fold line and insert portions on opposite sides of the fold line.

In such an embodiment the polyolefin layers of the UMC, folded polymer insert and are partially melted while pressing between rollers to form the integral polyolefin layers of the liner.

In such an embodiment at least one of the rollers is heated.

In accordance with further embodiments, the invention includes a non-folded multilayer insert and/or a thermoplastic elastomer layer.

In one embodiment, a liner is provided comprising:
three stacked multilayer components thermally laminated together to form a composite liner, the liner having an induction heat sealable lower layer for sealing to a rim of a container and a pull tab for ease of removal of the liner from the rim of the container, the three multilayer components comprising:
an upper multilayer component (UMC) comprising an upper support layer and a lower heat bondable polyolefin UMC layer; and
a lower multilayer component (LMC) comprising an upper heat bondable polyolefin LMC layer, the lower induction heat sealable layer, and an inductive heating layer therebetween;
an insert comprising an upper heat bondable polyolefin insert layer and a lower heat resistant separable layer that resists bonding to the LMC polyolefin layer by thermal lamination and induction heating to form the pull tab in the liner,
the liner being formed by a method comprising:
in a first area of the liner the UMC and LMC polyolefin layers are disposed facing one another and are thermally laminated by application of heat and pressure to form an integral polyolefin layer of a non-separable first liner portion; and
in a second area of the liner the insert is disposed between the UMC and LMC polyolefin layers respectively such that the heat resistant insert layer is facing the polyolefin UMC layer to form a second liner portion in which the insert and UMC layers form the pull tab.

In one embodiment, the liner insert further includes a lowermost release layer, the lowermost release layer being disposed adjacent the LMC upper layer in the second liner portion.

In one embodiment the liner has a substantially circular perimeter and the insert has an edge that intersects and extends across the circular perimeter at a length equal to or less than a diameter of the circular perimeter.

In one embodiment the liner UMC heat resistant layer is formed from one or more of polyethylene terephthalate, polyamide, polyethylene naphthalate, polypropylene, or any combination thereof.

In one embodiment the liner insert includes a lowermost release layer between the UMC heat resistant layer and the LMC polyolefin layer.

In one embodiment the liner is punched from a thermally laminated web of the three multilayer components.

In one embodiment the polyolefin layers of the liner are thermally laminated by at least partially melting the adjacent polyolefin layers.

In one embodiment the polyolefin layers of the liner are formed from at least one of an ethylene-based polymer and a propylene-based polymer.

In one embodiment of the liner the ethylene-based polymer is an ethylene-alpha olefin copolymer and the propylene-based polymer is a propylene-alpha olefin copolymer.

In one embodiment the polyolefin layers of the liner are formed from at least one of ethylene vinyl acetate (EVA) based polymers, ethylene-methyl acrylate (EMA) based polymers, and ethylene-ethyl acrylate (EEA) based polymers.

In one embodiment the polyolefin layers of the liner comprise polypropylene, polyethylene, and copolymers and blends thereof.

In one embodiment of the liner the inductive heating layer comprises a metal foil layer.

In one embodiment of the liner the multilayer components are formed by one or more of extrusion, co-extrusion, extrusion coating, extrusion lamination, and dry bond lamination.

In one embodiment a method of forming a liner is provided comprising:
thermally laminating together three stacked multi-layer components to form a composite liner, the liner having an induction heat sealable lower layer for sealing to a rim of a container and a pull tab for ease of removal of the liner from the rim of the container, the three multi-layer components comprising:
an upper multilayer component (UMC) comprising an upper support layer and a lower heat bondable polyolefin layer; and
a lower multilayer component (LMC) comprising an upper heat bondable polyolefin layer, the lower induction heat sealable layer, and an inductive heating layer therebetween;
an insert comprising an upper heat bondable polyolefin insert layer and a lower heat resistant separable layer that resists bonding to the LMC polyolefin layer by thermal lamination and induction heating to form the pull tab in the line,
wherein the method includes:
disposing a first area of the UMC and LMC polyolefin layers facing one another,
disposing the insert between a second area of the UMC and LMC polyolefin layers such that the heat resistant insert layer is facing the polyolefin UMC layer, and
forming a non-separable first liner portion by thermally laminating the facing polyolefin layers in the first area by application of heat and pressure to form an integral polyolefin layer from the facing UMC and LMC polyolefin layers, and
forming a second liner portion having the pull tab formed form the insert and UMC layers in the second area.

In one embodiment the polyolefin layers of the liner are formed from at least one of an ethylene-based polymer and a propylene-based polymer.

In one embodiment the ethylene-based polymer is an ethylene-alpha olefin copolymer and the propylene-based polymer is a propylene-alpha olefin copolymer.

In one embodiment the polyolefin layers are formed from at least one of ethylene vinyl acetate (EVA) based polymers, ethylene-methyl acrylate (EMA) based polymers, and ethylene-ethyl acrylate (EEA) based polymers.

In one embodiment the polyolefin layers comprise polypropylene, polyethylene, and copolymers and blends thereof.

In one embodiment the insert further includes a lowermost release layer disposed adjacent the LMC upper layer in the second liner portion.

In one embodiment the multilayer components are formed by one or more of extrusion, co-extrusion, extrusion coating, extrusion lamination, and dry bond lamination.

In one embodiment a method of forming a liner is provided, wherein the method comprises:
providing the stacked three multilayer components; and
forming the integral polyolefin layers in the first liner portion in a single thermal laminating step.

In one embodiment the UMC is formed, prior to the thermal laminating step, by one or more of extrusion, co-extrusion, extrusion coating, extrusion lamination, and dry bond lamination.

In one embodiment the LMC is formed, prior to the thermal laminating step, by one or more of extrusion, co-extrusion, extrusion coating, extrusion lamination, and dry bond lamination.

In one embodiment the UMC heat resistant layer is formed from one or more of polyethylene terephthalate, polyamide, polyethylene naphthalate, polypropylene, or any combination thereof.

In one embodiment the UMC and LMC polyolefin layers are partially melted while pressing between rollers to form the integral polyolefin layer of the liner.

In one embodiment at least one of the rollers is heated.

In one embodiment a liner is provided comprising:
three stacked multilayer components thermally laminated together to form a composite liner, the liner having an induction heat sealable lower layer for sealing to a rim of a container and a pull tab for ease of removal of the liner from the rim of the container, the three multilayer components comprising:
an upper multilayer component (UMC) comprising an upper support layer and a lower heat bondable UMC layer; and
a lower multilayer component (LMC) comprising an upper heat bondable LMC layer, the lower induction heat sealable layer, and an inductive heating layer therebetween, and at least one LMC layer comprises a thermoplastic elastomer (TPE) based on a polyolefin or polystyrene based TPE;
an insert comprising an upper heat bondable insert layer and a lower heat resistant separable layer that resists bonding to the LMC heat bondable layer by thermal lamination and induction heating to form the pull tab in the liner,
the liner being formed by a method comprising:
in a first area of the liner the UMC and LMC heat bondable layers are disposed facing one another and are thermally laminated by application of heat and pressure to form an integral layer of a non-separable first liner portion; and
in a second area of the liner the insert is disposed between the UMC and LMC heat bondable layers respectively such that the heat resistant insert layer is facing the UMC heat bondable layer to form a second liner portion in which the insert and UMC layers form the pull tab.

In one embodiment of the liner the polyolefin or polystyrene based TPE layer comprises the upper heat bondable LMC layer.

In one embodiment of the liner the UMC lower heat bondable layer comprises a polyolefin layer.

In one embodiment of the liner the polyolefin or polystyrene based TPE layer is disposed between the UMC upper heat bondable layer and the inductive heating layer.

In one embodiment of the liner the UMC upper heat bondable layer comprises a non-foam polyolefin layer.

In one embodiment a method of forming a liner is provided the method comprising:
thermally laminating together three stacked multi-layer components to form a composite liner, the liner having an induction heat sealable lower layer for sealing to a rim of a container and a pull tab for ease of removal of the liner from the rim of the container, the three multi-layer components comprising:
an upper multilayer component (UMC) comprising an upper support layer and a lower heat bondable UMC layer; and
a lower multilayer component (LMC) comprising an upper heat bondable LMC layer, the lower induction heat sealable layer, and an inductive heating layer therebetween, and at least one LMC layer comprises a thermoplastic elastomer (TPE) based on a polyolefin or polystyrene based TPE;
an insert comprising an upper heat bondable insert layer and a lower heat resistant separable layer that resists bonding to the LMC heat bondable layer by thermal lamination and induction heating to form the pull tab in the liner,
wherein the method includes:
disposing a first area of the UMC and LMC heat bondable layers facing one another,
disposing the insert between a second area of the UMC and LMC heat bondable layers such that the heat resistant insert layer is facing the heat bondable UMC layer, and
forming a non-separable first liner portion by thermally laminating the facing heat bondable layers in the first area by application of heat and pressure to form an integral layer from the facing UMC and LMC heat bondable layers, and
forming a second liner portion having the pull tab formed form the insert and UMC layers in the second area.

In one embodiment the polyolefin or polystyrene based TPE layer comprises the upper heat bondable LMC layer.

In one embodiment the polyolefin or polystyrene based TPE layer is disposed between the LMC upper heat bondable layer and the inductive heating layer.

In one embodiment the LMC upper heat bondable layer comprises a non-foam polyolefin layer.

In one embodiment the UMC lower heat bondable layer comprises a polyolefin layer and the LMC heat bondable layer comprises a polyolefin layer.

In one embodiment the polyolefin layers of the liner are formed from at least one of an ethylene-based polymer and a propylene-based polymer.

In one embodiment the ethylene-based polymer is an ethylene-alpha olefin copolymer and the propylene-based polymer is a propylene-alpha olefin copolymer.

In one embodiment the polyolefin layers are formed from at least one of ethylene vinyl acetate (EVA) based polymers, ethylene-methyl acrylate (EMA) based polymers, and ethylene-ethyl acrylate (EEA) based polymers.

In one embodiment the polyolefin layers comprise polypropylene, polyethylene, and copolymers and blends thereof.

In one embodiment the insert further includes a lowermost release layer disposed adjacent the LMC upper layer in the second liner portion.

In one embodiment the multilayer components are formed by one or more of extrusion, co-extrusion, extrusion coating, extrusion lamination, and dry bond lamination.

In one embodiment a method is provided, wherein the method comprises:
providing the stacked three multilayer components; and
forming the integral polyolefin layer in the first liner portion in a single thermal laminating step.

In one embodiment the UMC is formed, prior to the thermal laminating step, by one or more of extrusion, co-extrusion, extrusion coating, extrusion lamination, and dry bond lamination.

In one embodiment the LMC is formed, prior to the thermal laminating step, by one or more of extrusion, co-extrusion, extrusion coating, extrusion lamination, and dry bond lamination.

In one embodiment the UMC heat resistant layer is formed from one or more of polyethylene terephthalate, polyamide, polyethylene naphthalate, polypropylene, or any combination thereof.

In one embodiment the UMC and LMC polyolefin layers are partially melted while pressing between rollers to form the integral polyolefin layer of the liner.

In one embodiment at least one of the rollers is heated.

BRIEF DESCRIPTION OF THE DRAWINGS

FIGS. 8-10 illustrate alternative embodiments for making a folded insert.

FIG. 12 shows the three-layer component of FIGS. 1-7; FIG. 13 shows a four layer component having an additional PET layer; FIG. 14 shows an alternative three layer component having a top layer of foam rather than a solid polymer layer; and FIG. 15 shows an alternative four layer component having both the foam and PET layers.

FIG. 12 shows a three-layer lower component in which the TPE layer is the uppermost layer of the lower component; FIG. 13 shows a four layer lower component having an additional PET layer between an aluminum foil layer and a lowermost heat seal layer; FIG. 14 shows an alternative four layer lower component having an uppermost solid polyolefin layer above the TPE layer (of the FIG. 12 embodiment); and FIG. 15 shows an alternative four layer lower component having both an uppermost solid polyolefin layer and a PET layer (of FIGS. 13 and 14).

DETAILED DESCRIPTION OF THE INVENTION

Figure 1:
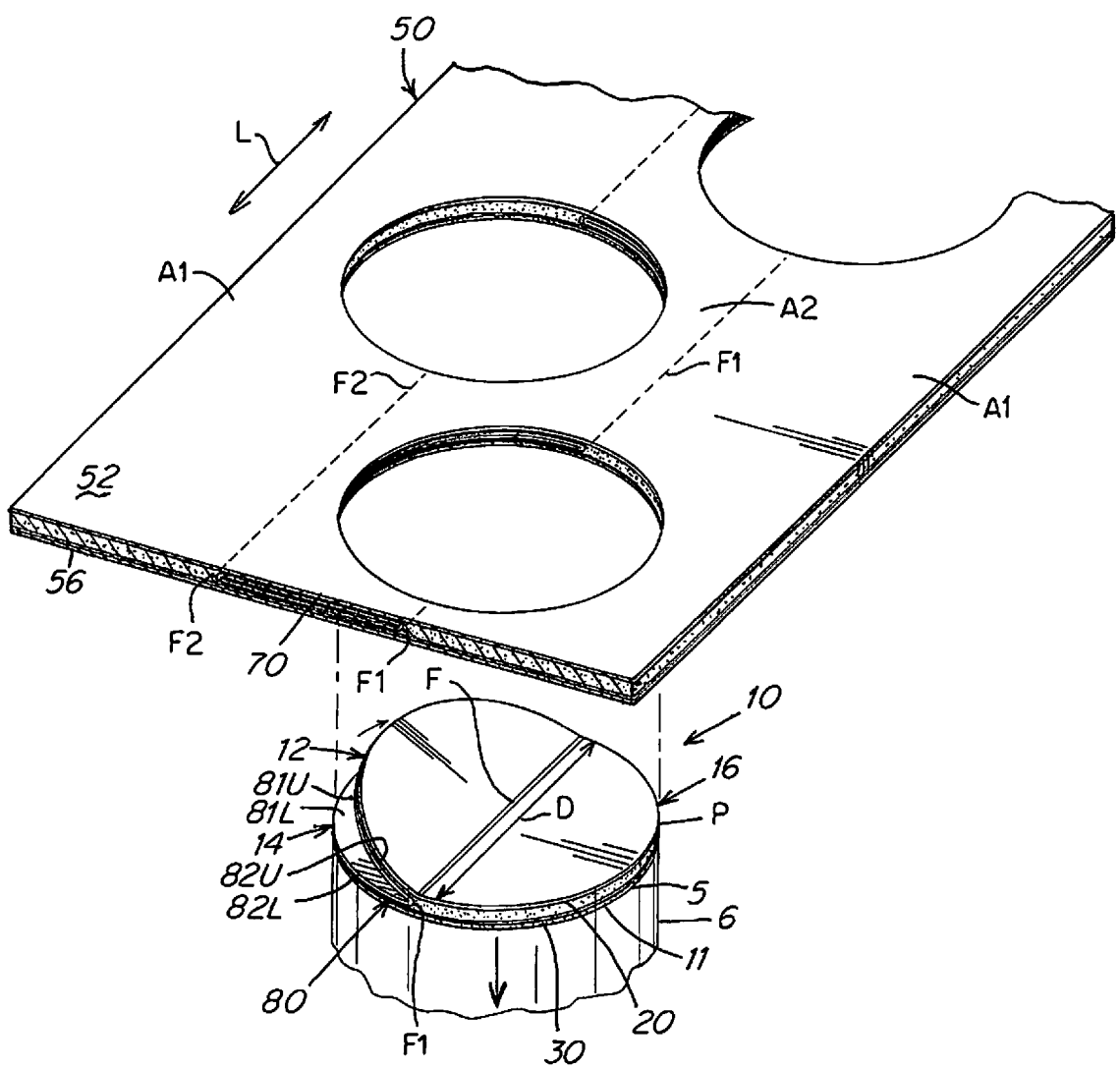
FIG. 1 is a schematic view, according to one embodiment of the invention, of a thermally laminated multilayer web from which multiple induction heat-sealable liner disks are punched, showing one such punched liner disk applied to the rim of a container, and with the pull tab extending (via a hinged fold line) from an upper side of the liner.

Various embodiments of the invention will now be described with regard to the accompanying figures. These examples are nonlimiting and meant to illustrate various embodiments of the liner configuration, materials, and manufacturing processes.

An induction heat-sealable liner, also referred to as a sealing disk, is provided which includes a hinged tab. The liner has a three layer stacked construction, including a multi-layer upper component, a multi-layer lower component, and disposed between one area of the upper and lower components, an insert for forming the hinged tab.

In various embodiments, the liner includes a lowermost induction heat-sealable layer, an inductive heating layer (e.g., a metal film layer that heats resistively during the induction heat sealing operation) above the lowermost heat-sealable layer, and one or more layers of reinforcing (support) materials for enhancing the mechanical strength of the liner (e.g., enabling the liner to be punched, inserted into a closure, pushed down over the mouth of the container by the closure (e.g. screw cap), induction heat sealed to the container rim, and subsequently pulled from the container rim without rupturing).

As used herein, a layer or sheet of inductive heating material is any material which heats resistively when it conveys an induced electrical current. Typically the inductive heating layer is a metal foil layer, such as aluminum foil.

The induction heat sealable (lowermost) layer can be made from any polymeric material that will soften and seal to the rim of a container, while allowing the heat seal bond to be later ruptured by a user (person) grasping the pull tab and pulling the liner away from the container rim. The heat sealable layer is typically made from a material selected from the group comprising polyethylene, polypropylene and copolymers and blends thereof; such materials may be copolymers with ethylene such as with vinyl acetate, methyl acrylate, ethyl acrylate, or with a variety of alpha olefins such as butene, hexane, or octane. The inductive heating layer and the heat sealable layer may be joined by means of a binder (e.g., a two component isocyanate-hydroxyl adhesive). In another embodiment, the inductive heating layer may be coated with a heat sealable material.

In various embodiments the liner includes multiple (initially separate) layers of polyolefin material that when brought into engagement during the thermal lamination process, i.e., the application of heat and pressure, will be softened or partially melted so as to form an integral polyolefin layer. The polyolefin may be one or more of polyethylene, polypropylene, polyethylene vinyl acetate (EVA), polyethylene-methyl acrylate (EMA), and polyethylene-ethyl acrylate (EEA). The polyolefin material may comprise a single polymer, a copolymer, or blend. Preferably the polyolefin layers are formed from at least one of an ethylene-based polymer and a propylene-based polymer. The ethylene-based polymer may be an ethylene-alpha olefin copolymer, and the propylene-based polymer may be a propylene-alpha olefin copolymer.

Additional layers of the liner may include a reinforcing layer, such as a bi-axially oriented polyester film having a thickness of between 4 and 100 micrometers. The overall liner thickness may typically range between 100 and 600 micrometers.

As used herein, thermal lamination means the application of heat and pressure in order to thermally bond adjacent polyolefin layers to form a composite liner construction, including the hinged pull tab, that resists delamination in use during the removal of the liner from the container finish. The heat and pressure may be applied for example, by feeding the various layers jointly between rotating rollers, wherein one or more of the rollers may be heated. Other methods are known for applying heat and pressure to accomplish thermal lamination, and the invention is not limited to a particular method of thermal lamination. As used herein, the starting multi-layer components may be formed by lamination, co-extrusion, extrusion coating, dry bond lamination (which may include water, solvent, or solvent less adhesive), or any of various methods know in the art for forming multi-layer sheet materials.

Various examples of the invention will now be described.

First Embodiment of FIG. 1-15 with Folded Insert

FIGS. 1-7 show one method of forming a liner utilizing a collapsed multilayer tube to form the folded insert. In other embodiments, the folded insert is formed by folding a multi-layer sheet material, without use of a multi-layer tube.

FIG. 1 shows an induction heat sealable liner 10 in the form of a circular disk (having a circular perimeter P) that has been punched (with a circular die not shown) from a sheet or web 50 of laminated construction. The liner 10 has a lowermost surface layer 11 that can be heat sealed to a rim 5 of a container neck 6, by induction heat sealing.

Figure 2:
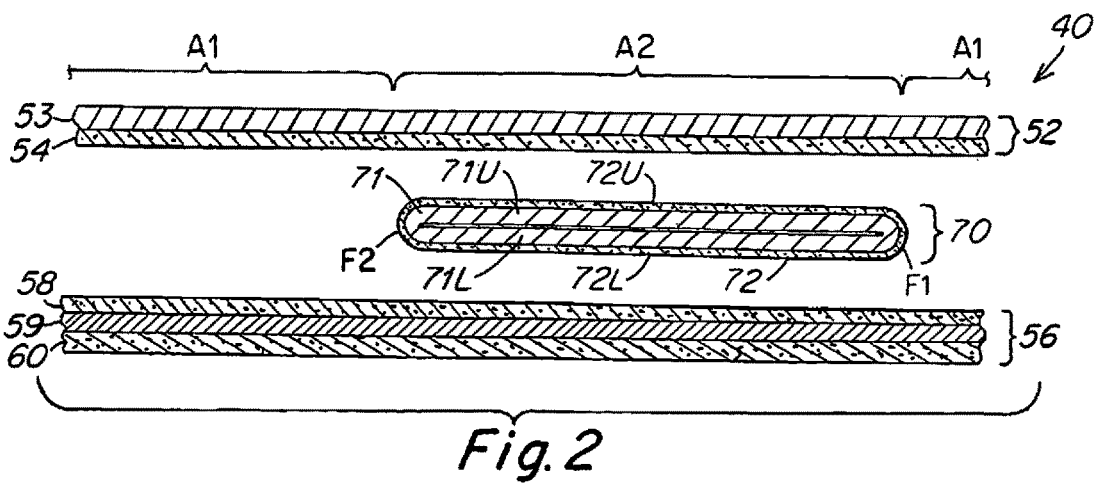
FIG. 2 is an exploded cross sectional view of three multi-layer components used to make the laminated web of FIG. 1, namely a radially collapsed coextruded tube (for forming the multi-layer folded insert) positioned between a multi-layer upper component and a multi-layer lower component; the collapsed coextruded tube is subsequently cut (punched) transversely through the collapsed tube thickness to form a liner, including a folded position of the collapsed tube that forms the pull tab.
Figure 8A:
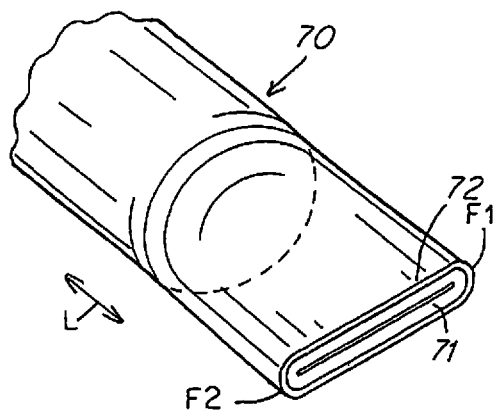
FIGS. 8A and 8B are schematic cross sectional views of a first embodiment utilizing a coextruded two-layer tube that is collapsed in the radial (thickness) direction (similar to that shown FIGS. 1-7)

The laminated web 50 includes at least one strip, here a collapsed coextruded tube 70, aligned in the lengthwise direction, that will form the multilayer folded insert. The collapsed coextruded tube 70 comprises an inner tubular layer 71 of a separable (heat resistant) material and a concentric outer tubular layer 72 of a polyolefin (heat bondable) material (as shown in FIGS. 2 and 8A); the tube has been collapsed (in the radial direction) to form fold lines F1 and F2 at opposing ends of the collapsed tube. The web 50 comprises: a) in a first area (A1), a two-component stacked construction, including upper and lower multi-layer components 52, 56, that have been laminated together without a collapsed tube layer 70 therebetween; and b) in a second area (A2), bounded axially by fold lines F1 and F2, a three-component stacked construction, including the collapsed coextruded tube 70 (or other folded insert embodiment) aligned in a lengthwise L direction, and laminated between the upper and lower multi-layer components 52, 56. This is best illustrated in FIGS. 2-6, and discussed further below.

The multi-layer liner 10 is punched from both the two component (A1) and three component (A2) areas of the web 50, to form a multi-layer folded insert 80 having a fold line F, the fold line comprising one of the two folded edges F1, F2 of the collapsed tube 70 in the web 50. In this embodiment the folded insert 80 has a substantially circular perimeter P and the fold line F intersects and extends across the circular perimeter P at a length equal to or less than the length of the diameter of the circular tab liner.

The punched liner 10 (of FIG. 1) has a first portion 16 to the right of the fold line F formed from a heat bondable polyolefin layer of area A1 of the web which does not include the collapsed tube. This first area 16 is formed from the multi-layer upper component 52 being directly bonded (thermally laminated) to an adjacent (facing) heat bondable polyolefin layer of the multi-layer lower component 56. A second portion 14 of the liner 10 to the left of the fold line F, is formed from area A2 of the web and includes a folded portion 80 of the collapsed tube 70 thermally laminated (again by facing polyolefin layers) between the upper and lower components 52, 56. The folded portion 80 in the second liner portion 14 forms the hinged pull tab 12, resulting from separation of facing surfaces 81U, 81L of the collapsed separable inner tube layer 71 (as shown in FIGS. 2 and 8A) which are made of a heat resistant polymer and do not bond to each other during either the thermal lamination (to form the web 50) or the subsequent induction heat sealing process (for bonding the liner 10 to the container rim 5).

The punched liner 10 thus includes a portion of the collapsed or folded coextruded tube 70, now referred to as a multi-layer folded insert 80 of the liner 10. In this embodiment, the folded insert 80 is semi-circular in shape, comprising a portion of the folded tube 70 that includes a straight fold line F (same as F1 of web 50) extending across a diameter D of the disk, separating the disk into roughly two equal semi-circular portions, i.e., a non-separable first liner portion 16 to the right of the fold line F, and a second liner area 14 including and to the left of the fold line F, forming the pull tab 12. The second liner portion 16 includes the upper and lower components 52, 56, with the folded insert 80 therebetween. The folded insert includes facing upper and lower semi-circular surfaces 81U, 81L of the heat resistant inner tube layer 71 that are hinged at the fold line F (like a clam shell). The folded insert 80 further includes upper and lower semi-circular surfaces 82U, 82L, of the heat bondable polyolefin outer tube layer 72 thermally laminated to facing heat bondable polyolefin layers of each of the lowermost layer 20 of upper component 52, and uppermost layer 30 of the lower component 56, respectively. The upper 82U/20 and lower 82L/30 composite layers (following thermal lamination) are joined at the fold line F, wherein upper composite layers 82U/20 are movable between a first (closed) position adjacent to the lower composite layers 82L/30, to a second (open) position rotated about the hinge (fold line F) and thus spaced apart from the lower composite so as to form the pull tab 12.

In summary, the separation between the upper 82U/20 and lower 82L/30 composite layers (in liner portion 14) is due to the separable inner layers 81U, 81L of the folded insert 80. In liner portion 16, the upper and lower multi-layer components 20, 30 are thermally laminated together without the folded insert 80, and thus are not separable.

FIGS. 2-6 illustrate one embodiment of a method of making the web 50 and liner 10 of FIG. 1. The layers of the web and liner are shown in cross section for ease of understanding during the various manufacturing steps.

FIG. 2 illustrates three spaced apart, stacked components 52, 70, 56 that are the starting materials 40 for forming the thermally laminated web 50, from which the liner disks 10 will be punched. A multi-layer upper component 52 has an upper layer 53 formed from a reinforcing material, here a bi-axially oriented polyester film, such as polyethylene terephthalate (PET). The lower layer 54 of the upper component comprises a polyolefin material that is thermally bondable to an adjacent polyolefin layer as described below.

The lower multi-layer component 56 has an upper layer 58, also formed from polyolefin material, that will be thermally bonded either to the adjacent lower polyolefin layer 54 of the upper component 52, in a first area A1, or to an adjacent outer polyolefin layer 72L of the collapsed coextruded tube 70 disposed between the upper and lower components 52, 56 in a second area A2. Similarly, the lower polyolefin layer 54 of the upper component 52 will be bonded to an adjacent outer polyolefin layer 72U of the collapsed coextruded tube 70, in the first area A1. The lower component 56 further includes: a lowermost induction heat sealable layer 60, and an inductive heating layer 59 (here aluminum foil) provided between the lower heat sealable layer 60 and the upper polyolefin layer 58.

While the detailed embodiment described herein utilizes a collapsed (folded) tube for making the folded insert, in other embodiments the folded insert is made without a tube, e.g., by folding a multi-layer sheet. Furthermore, there may be one or more other layers in the liner, such as other reinforcing layers (e.g., of PET, nylon or other suitable materials known in the art).

Figure 3:
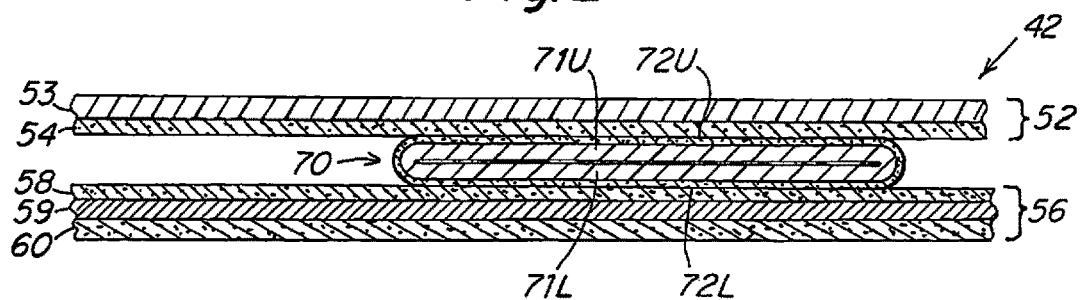
FIG. 3 is cross sectional view showing the three multi-layer components of FIG. 2 brought into contact with one another, prior to thermal lamination.
Figure 4:
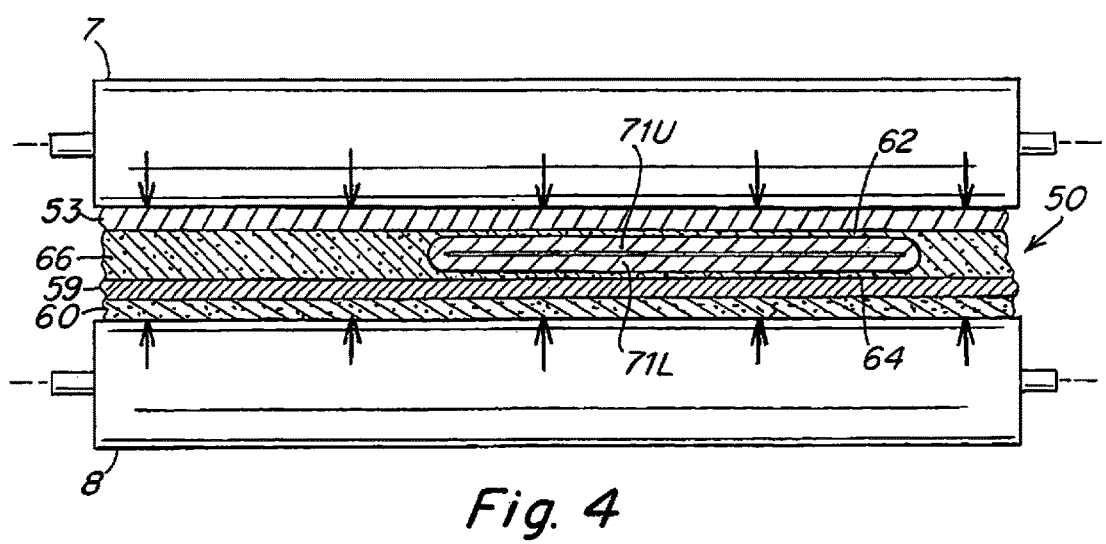
FIG. 4 is a cross sectional view showing the three multilayer components of FIGS. 2-3 being fed between heated rotating rollers for thermally laminating the various multi-layer components into a composite laminated web.
Figure 5:
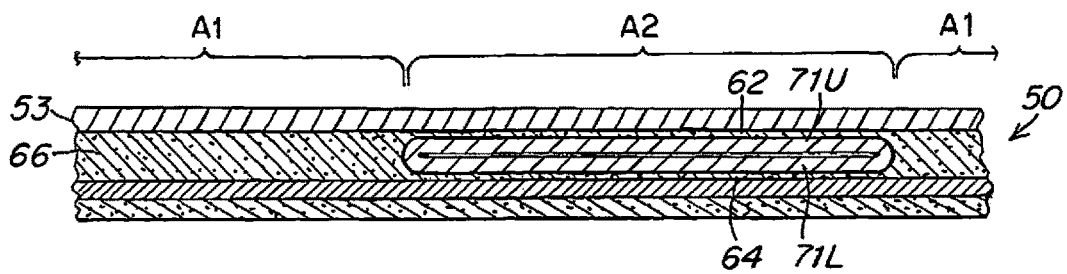
FIG. 5 is a cross sectional view showing the finished laminated web, resulting from the thermal lamination process of FIG. 4.

In FIG. 3, the three spaced apart, stacked components 52, 70, 56 of FIG. 2 have been brought into contact with one another as a stacked composite 42 (the vertical spacing eliminated) in preparation for feeding the stacked composite 42 between opposing pressure rollers 7, 8 (shown in FIG. 4) in order to thermally laminate the three components 52, 70, 56 together to form, in a single thermal laminating step, the laminated web 50 from which multiple liners 10 may be subsequently punched. FIG. 5 shows a portion of the finished thermally laminated web 50, exiting from the rollers 7, 8. In area A2, the originally separate polyolefin layers that are adjacent to one another, namely polyolefin layer 54 of the upper component 52 and polyolefin layer 72U of the coextruded tube strip 70 respectively, have been at least partially melted or softened (during thermal lamination) and now each form a respective single integral polyolefin layer 62, disposed above the inner layer 71U of coextruded tube 70. Also in area A2, separate polyolefin layers 58/72L of the lower component 56 and folded tube 70 respectively are thermally laminated to form a single integral polyolefin layer 64, below inner layer 71L of the tube 70. In the other area A1, the lower polyolefin layer 54 of the upper component 52, and the upper polyolefin layer 58 of the lower component 56, now form a single integral polyolefin layer 66 between the upper and lower components following thermal lamination. As used herein an integral polyolefin layer means a layer whose bond strength is higher than the bond strength of the induction heat sealable layer 60 to the container rim; thus the integral layer can be comprised of one or more polymer materials that are compatible, so long as the bond strength of the integral layer 62, 64, 66 is higher than the bond strength of the induction heat sealable layer 60 to the container rim.

Figure 6:
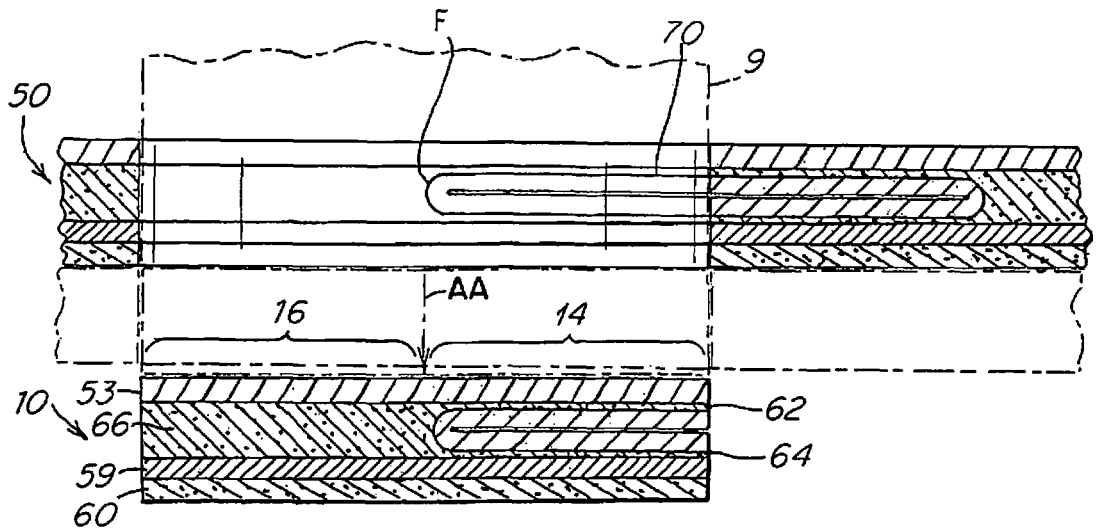
FIG. 6 illustrates a process for punching a liner disk from the laminated web of FIG. 5, such that the resulting liner includes a folded portion of the collapsed coextruded tube (of FIG. 2).

FIG. 6 illustrates a die punching procedure for punching a liner 10 from the web 50. An individual liner 10 is cut as a circular disk by a die punch 9 (in the direction of arrow AA). The punched liner disk includes approximately one semi-circular half of the collapsed coextruded tube 70, including the folded edge F of the collapsed tube, in order to form the liner portion 14, and the other liner portion 16 without the insert. In both liner portions 14, 16, the previously adjacent polyolefin layers now form a single integral polyolefin layer 62/66/64 (across a portion of the liner disk) that provides a simplified construction, a strong bond that resists delamination, and a reduced number of assembly steps. In other embodiments, the punched liner does not have to include equal portions of 16 and 14, i.e. the liner can be punched off center with respect to the fold line in order to produce unequal portions 16 and 14, creating a smaller or larger tab portion.

Figure 7:
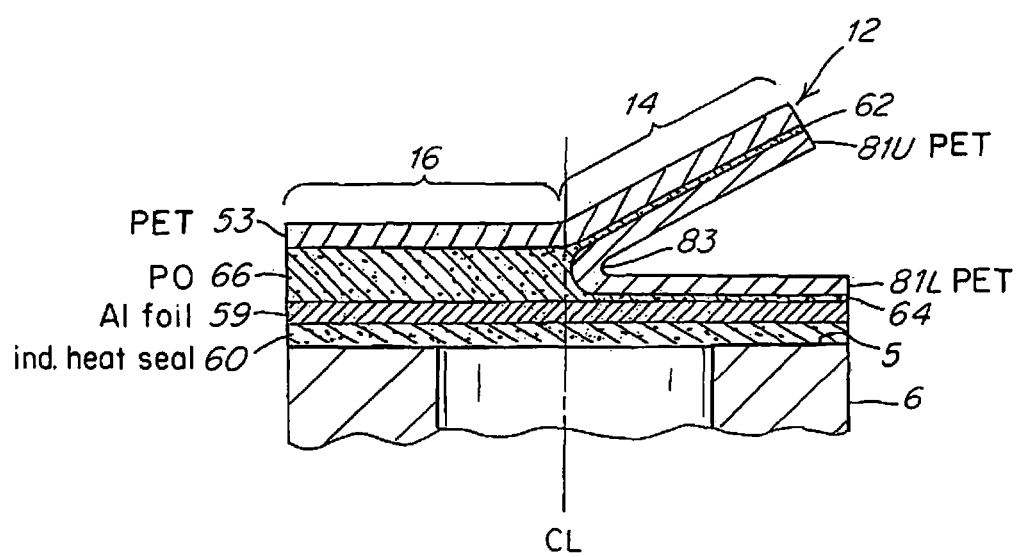
FIG. 7 is a cross sectional view showing the punched liner of FIG. 6 attached to the rim of a container by induction heat sealing; a separable inner layer of the collapsed coextruded tube (of FIG. 2) is made of a heat resistant polymeric material that resists bonding during both the thermal lamination and the induction heat sealing processes to produce a pull tab in a second liner area, while in a first liner area, without the folded insert, the upper and lower multilayer components are thermally laminated with no separation (non-separable).

FIG. 7 shows the punched liner of FIG. 6, with its lowermost heat sealable layer 60 now bonded (induction heat sealed) to the rim 5 of a container 6. FIG. 7 also shows the movable tab 12 in an open position for ease of grasping by a user. In this embodiment, the inner separable layer 71 of the collapsed coextruded tube 70 (see FIGS. 2 and 8A), which forms the facing separable layers 81U, 81L of the liner, is formed of a polyester material that resists the heat and pressure of the thermal lamination step so as to remain separable and form the tab 12. The separable inner tube layer may comprise any of various known materials, for example, a polyester such as polyethylene terephthalate, polyethylene naphthalate (PEN), or a polyamide such as nylon 6, or nylon 66. The outer layer 72 of the collapsed coextruded tube 70, is made of a polyolefin material which, during the thermal lamination process, bonds with the adjacent polyolefin layers 54, 58 of the upper and lower multilayer components 52, 56 respectively to form integral polymer layers 62 and 64 respectively (see FIG. 2) in the finished liner. Preferably, as shown in the embodiment of FIGS. 1-7, the first 14 and second 16 liner portions are disposed adjacent either side of a common center line CL of the liner and container neck 6, wherein the folded polymer insert 80 has a single fold line 83 disposed at or adjacent the center line CL. In other embodiments the fold line 83 is not disposed at the CL of the neck finish.

Figure 8B:
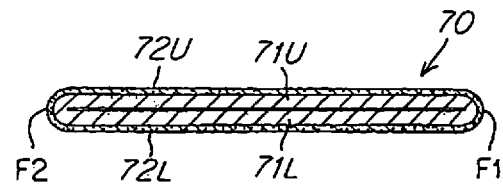

FIGS. 8-10 show three alternative embodiments for making a multilayer folded insert 80. FIGS. 8A-8B illustrate the collapsed coextruded tube embodiment of FIGS. 1-7, wherein a two-layer coextruded circular cylindrical tube 70 includes an outer heat bondable polyolefin layer 72 and an inner heat resistant PET layer 71. In FIG. 8B, the collapsed tube 70 has fold lines F1, F2 at opposing edges. The collapsed tube has adjacent inner layers 71U, 71L, and opposed outer layers 72U and 72L. In various embodiments there may be tie layers between the various layers, or other additional layers.

Figure 9A:
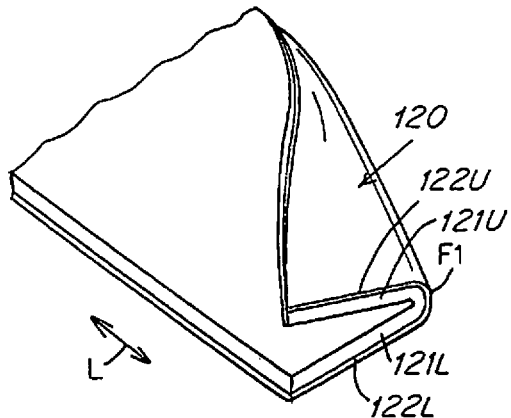
FIGS. 9A and 9B are schematic views of a two-layer strip that is folded in half in the thickness direction to form a folded insert having one fold line.
Figure 9B:
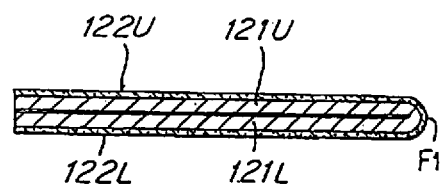

FIGS. 9A-9B show an alternative (non-tube) embodiment wherein a multilayer (e.g., coextruded or laminated) sheet 120 includes an outer polyolefin layer 122 and an inner heat resistant (e.g., PET) layer 121. The multilayer sheet is folded in the thickness direction at fold line F1, to form a folded sheet portion including facing interior layers 121U, 121L, and opposing outer layers 122U, 122L.

Figure 10A:
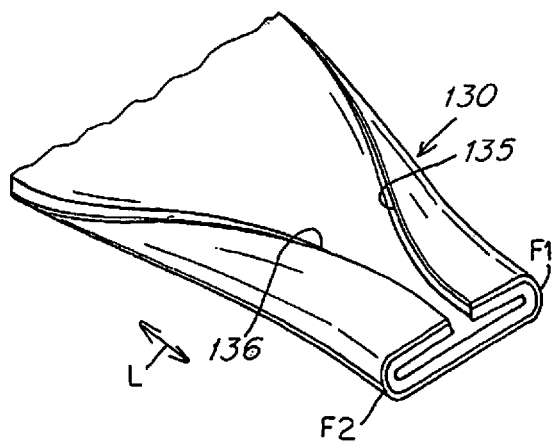
FIGS. 10A and 10B are schematic view of a two-layer strip wherein two opposing edges (ends) of the strip are folded inwardly toward one another to form two fold lines, one at each end of the double folded insert.
Figure 10B:
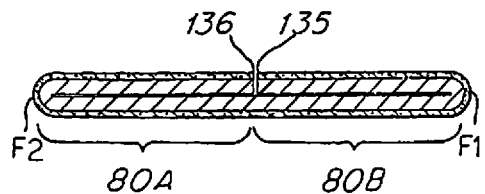

FIGS. 10A-10B show another embodiment in which a multi-layer sheet 130 is folded inwardly on itself from two opposing edges 135, 136, to form two fold lines F1, F2, one at each end of the double folded strip 130. The opposing edges 135, 136 of the strip are pulled toward one another until they are approximately adjacent, thus creating two essentially equal folded inserts 80A, 80B, one on either half of the double folded strip 130. Again, this double folded strip can be laid longitudinally (direction L) in a web as illustrated in FIG. 1, from which two individual liner disks may be punched, each including one of the opposite folded portions 80A, 80B of the strip.

Figure 11:
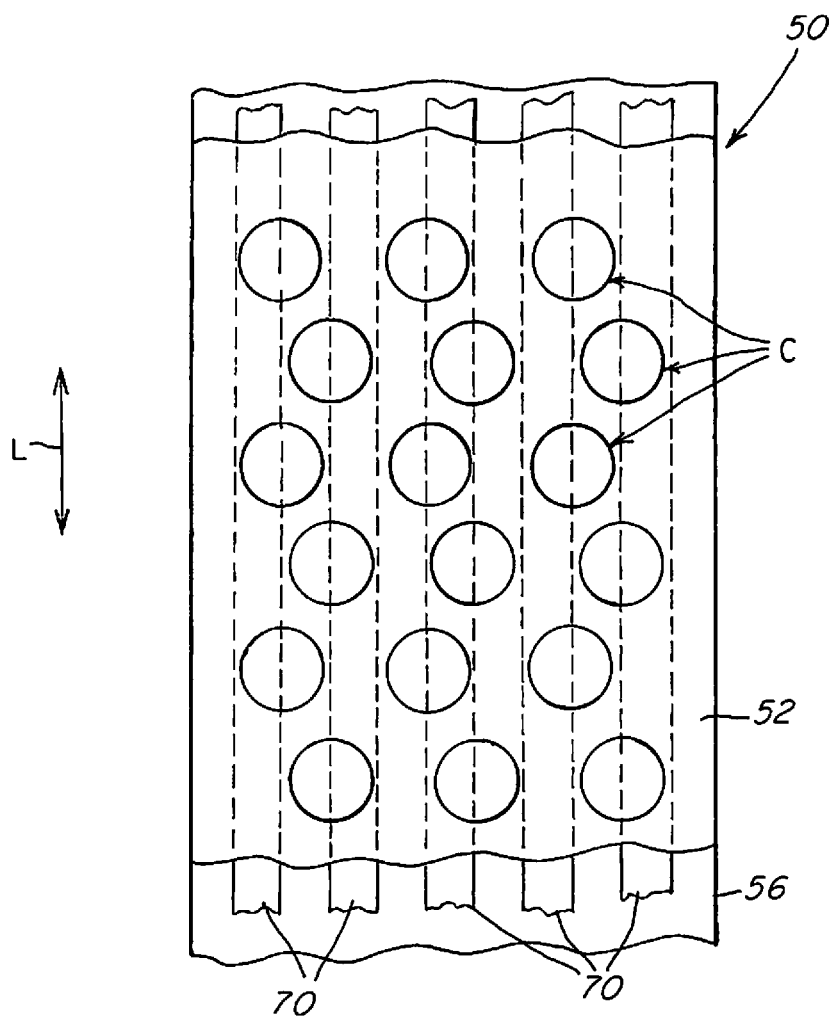
FIG. 11 is a top plan, partial cut away view of a thermally laminated web according to one embodiment, in which strips of a multi-layer folded insert, such as the collapsed coextruded tube of FIGS. 1-7, are laid down in spaced apart locations parallel to the longitudinal (length) direction of the web, and showing the locations (the circles in FIG. 11) of multiple liner disks to be punched from the web, each disk straddling a portion of the fold line of the collapsed coextruded tube so as to form a folded insert in the punched liner.

FIG. 11 illustrates a section of a web 50 (as in FIG. 1) wherein multiple elongated collapsed tube strips 70 (or folded inserts) are spaced apart across the width of the web, each aligned in the longitudinal direction (L), between upper and lower sheet components 52, 56 as previously described. The plurality of circles C illustrate locations at which individual disks 10 can be punched from the web so as to include a first liner portion 14 having a folded insert (e.g., a portion of the collapsed tube 70) located between the upper and lower components, and a second liner portion 16 wherein there is no folded insert between the upper and lower components.

FIGS. 12-15 illustrate alternative multi-layer constructions of the lower component. The layers of the various structures may be formed by co-extrusion, extrusion coating, extrusion lamination, or dry bond lamination.

Figure 12:
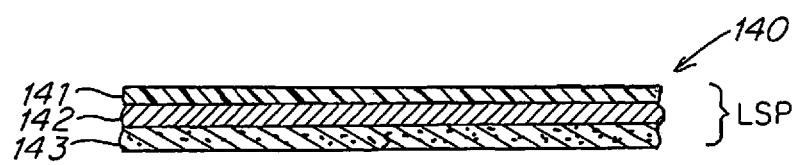
FIGS. 12-15 are cross sectional views showing alternative embodiments of the lower multi-layer component.

FIG. 12 shows one embodiment of a lower component 140 including, in serial order from top to bottom: an upper layer 141 of solid (non-foam) polyolefin, such as EVA or LDPE (low density polyethylene); a middle layer 142 of aluminum foil; and a lower heat sealing layer 143. This is the embodiment shown in FIGS. 1-7.

Figure 13:
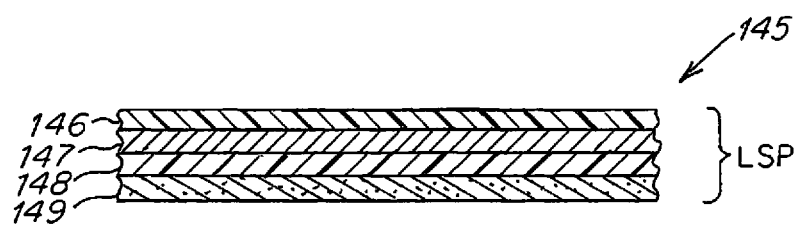

FIG. 13 shows an alternative four layer embodiment of the lower component 145 including, in serial order from top to bottom: an upper polyolefin layer 146, an aluminum foil layer 147, a PET layer 148, and lower heat sealing layer 149.

Figure 14:
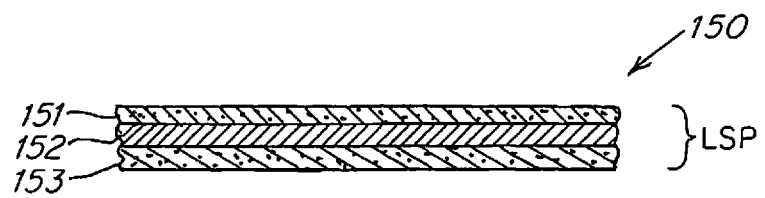

FIG. 14 illustrates a further alternative, in which the lower component 150 includes, in serial order from top to bottom: an upper polyolefin foam layer 151, an aluminum foil layer 152; and a lower heat sealing layer 153.

Figure 15:
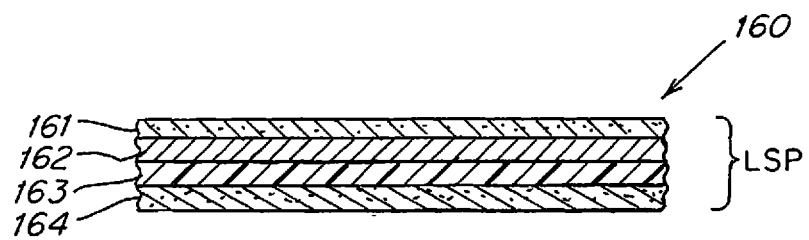

FIG. 15 shows a further alternative, in which the lower component 160 includes, in serial order from top to bottom: a polyolefin foam upper layer 161; an aluminum foil layer 162; a PET layer 163; and a lower heat sealing layer 164.

Second Embodiment of FIGS. 16-23 with Non-Folded Insert

Figure 16:
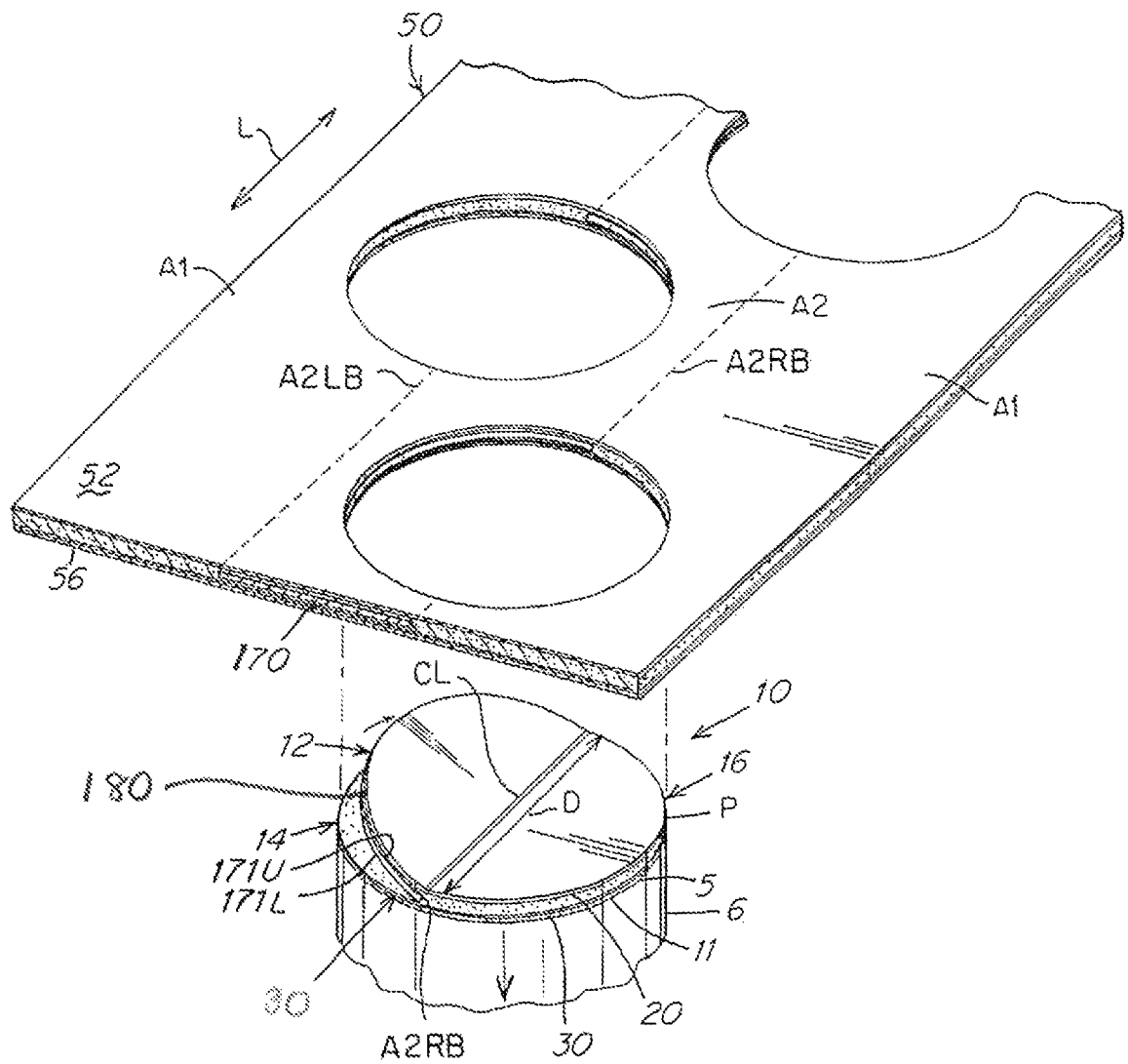
FIG. 16 is a schematic view, according to another embodiment of the invention, of a thermally laminated multilayer web from which multiple induction heat-sealable liner disks are punched, showing one such punched liner disk applied to the rim of a container, and with the pull tab extending from an upper side of the liner; in the embodiment of FIG. 16, the pull tab is formed from a non-folded multilayer insert component such as the two layer non-folded insert component shown in FIG. 16A or the three layer non-folded insert component shown in FIG. 16B.

FIG. 16 is a schematic view, according to another embodiment of the invention, of a thermally laminated multilayer web from which multiple induction heat-sealable liner disks are punched, showing one such punched liner disk applied to the rim of a container, and with the pull tab extending from an upper side of the liner. In the embodiment of FIG. 16, the pull tab is formed from a non-folded multilayer insert component such as the two layer non-folded insert component shown in FIG. 16A or the three layer non-folded insert component shown in FIG. 16B.

Figure 16A:
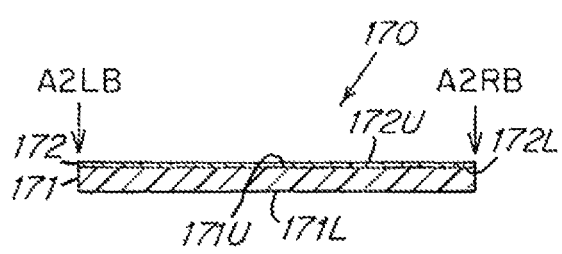

FIGS. 16-23 show one method embodiment utilizing the non-folded insert component of FIG. 16A. The method steps are similar to the method steps of FIGS. 1-7 and 11, and the same reference numbers are used in FIGS. 16-23 to denote the same components previously described, with the differences noted below.

Figure 23:
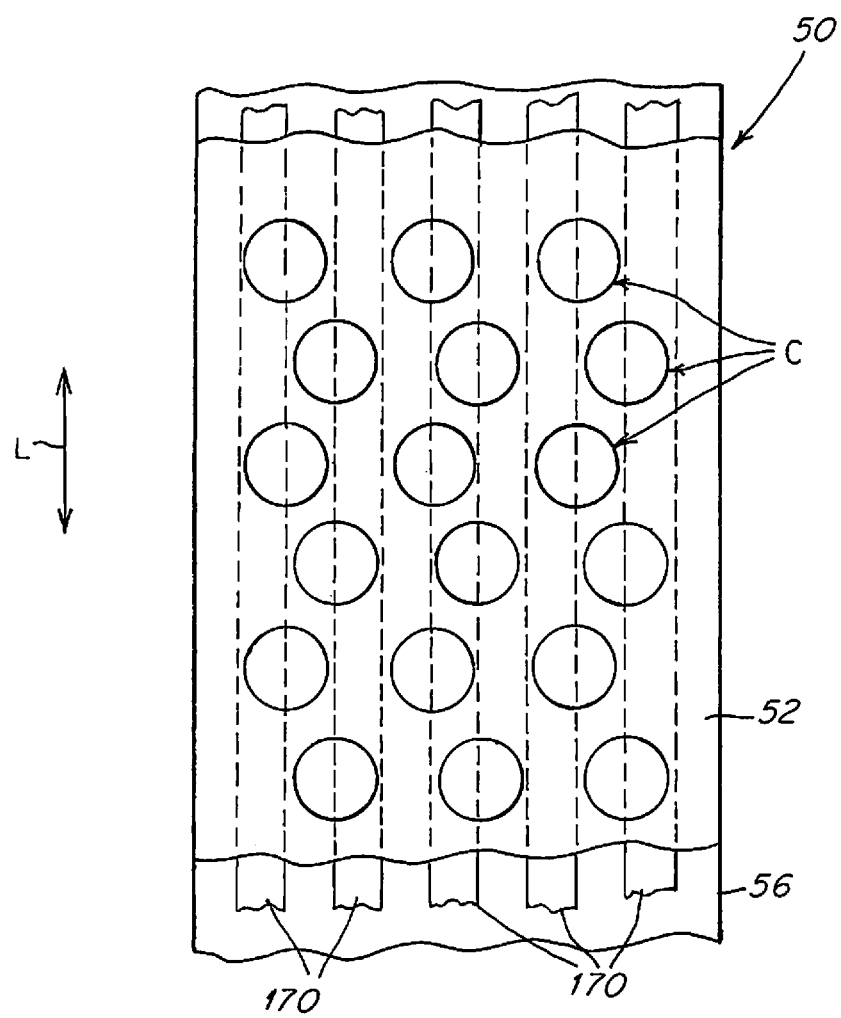
FIG. 23 is a top plan, partial cut away view of a thermally laminated web according to one embodiment, in which strips of a multi-layer non-folded insert component, such as that shown in FIG. 16A or FIG. 16B, are laid down in spaced apart locations parallel to the longitudinal (length) direction of the web, and showing the locations (the circles in FIG. 23) of multiple liner disks to be punched from the web, each disk straddling a portion of the insert component so as to form a separable tab in the punched liner.

FIG. 16 shows a web 50 (as in FIG. 1) in which a non-folded multilayer insert component 170 is substituted for the folded insert component 70 of FIG. 1. In this embodiment the strip A2 provides the non-folded insert component 170 between right and left strip boundaries A2RB and A2LB respectively. Disk 10 can be punched (as shown in FIGS. 16 and 23) across both the right A2RB and left A2LB boundaries such that half of each punched disk will include an insert portion 180 extending in one radial direction from the disc centerline CL toward the disc perimeter P, while the other half of the punched disc will not include the insert portion. Here the insert portion 180 is shown extending fully across one half of the punched circular disc; in other embodiments the insert portion 180 may extend less than the full half disc.

FIG. 16A shows a two layer insert component 170 extending between A2 boundaries A2LB and A2RB, including in cross section: an upper heat bondable polyolefin insert layer 172; and a lower heat resistant insert polymer layer 171 (e.g., such as a polyester (e.g. PET) or a polyamide (e.g., nylon)). As described below with reference to FIGS. 17-23, the polyolefin insert layer 172 has an upper surface 172U that will bond (by thermal lamination) to an adjacent surface of a heat bondable polyolefin layer 54 of the upper component 52, while the lower surface 171L of the heat resistant layer 171 will resist bonding (during thermal lamination) to the upper surface of polyolefin layer 58 of the lower component 56. Alternatively, a third release layer 273 (e.g., a silicone release layer, nitrocellulose release layer, fluoropolymer release layer, or other known in the art), may be added as the lowermost layer of the insert 270 (see FIG. 16B) to prevent thermal bonding of the insert to the upper surface of polyolefin layer 58 of the lower component 56.

Figure 17:
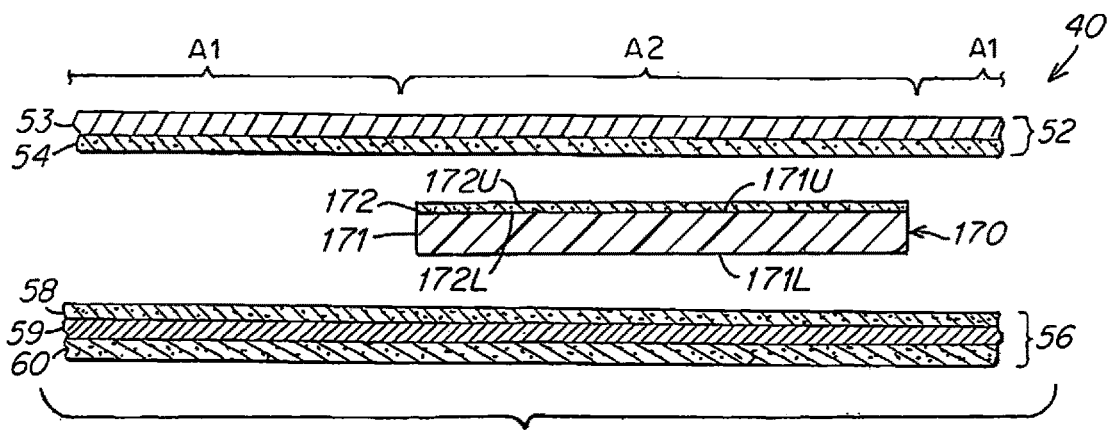
FIG. 17 is an exploded cross sectional view of three multi-layer components used to make the laminated web of FIG. 16, in which the non-folded two layer insert component of FIG. 16A is positioned between a multi-layer upper component and a multi-layer lower component; the laminated web is subsequently cut (punched) transversely through the thickness to form a liner having a pull tab.

FIG. 17 is an exploded cross sectional view of three multi-layer components used to make the laminated web of FIG. 16, in which the non-folded two layer insert component 170 of FIG. 16A is positioned between a multi-layer upper component 52 (same as in FIG. 2) and a multi-layer lower component 56 (same as in FIG. 2). Here the upper surface 172U of polyolefin insert layer 172 faces the lower surface 54L of polyolefin layer 54 of upper component 52 (for subsequent thermal bonding of the facing polyolefin layers in a first area of the disk), while the lower surface 171L of heat resistant layer 171 faces the upper surface of the uppermost polyolefin layer 58 of the lower component 56 (to resist thermal lamination in a second portion of the disk). The laminated web 50 is subsequently cut (punched) transversely through the thickness to form a liner 10 having a pull tab 12.

Figure 18:
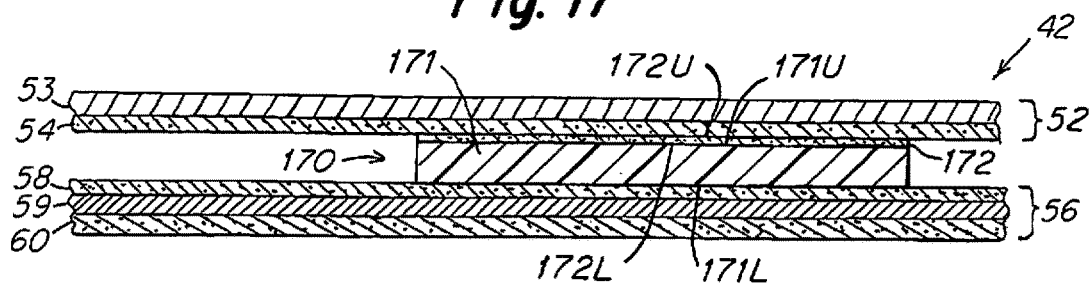
FIG. 18 is cross sectional view showing the three multi-layer components of FIG. 17 brought into contact with one another, prior to thermal lamination.

FIG. 18 is cross sectional view showing the three multi-layer components (52, 170, 56) of FIG. 17 brought into contact with one another, prior to thermal lamination.

Figure 19:
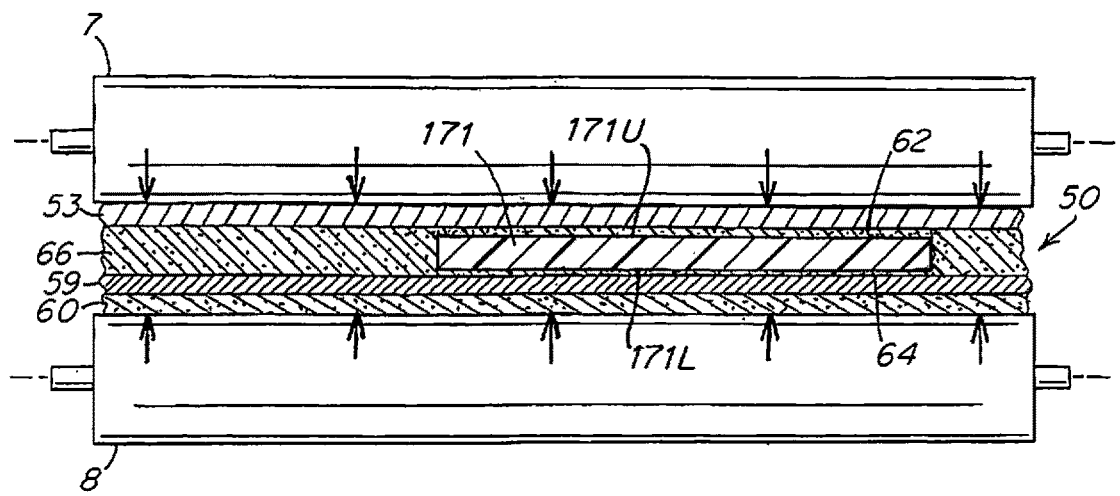
FIG. 19 is a cross sectional view showing the three multilayer components of FIGS. 17-18 being fed between heated rotating rollers for thermally laminating the various multi-layer components into a composite laminated web.

FIG. 19 is a cross sectional view showing the three multilayer components of FIGS. 17-18 being fed between heated rotating rollers 7, 8 for thermally laminating the various multi-layer components into a composite laminated web 50. In this embodiment, an integral polyolefin layer 66 is formed (see FIGS. 19-20) from thermal bonding of adjacent polyolefin layers 54 and 58 in the first liner portion A1; also integral with polyolefin layer 66 are each of polyolefin layer 62 (formed from thermal bonding of polyolefin layers 54 and 172) and polyolefin layer 58, in the second liner portion A2. Here the polyolefin layers 62 and 58 have not bonded with each other (because of the intermediate insert layer 171), but they are integral with layer 66 across the CL boundary of the first A1 and second A2 liner portions.

Figure 20:
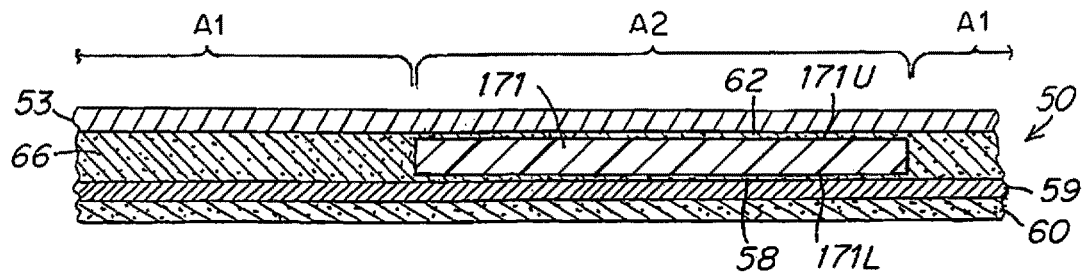
FIG. 20 is a cross sectional view showing the finished laminated web, resulting from the thermal lamination process of FIG. 19.

FIG. 20 is a cross sectional view showing the finished laminated web 50, resulting from the thermal lamination process of FIG. 19.

Figure 21:
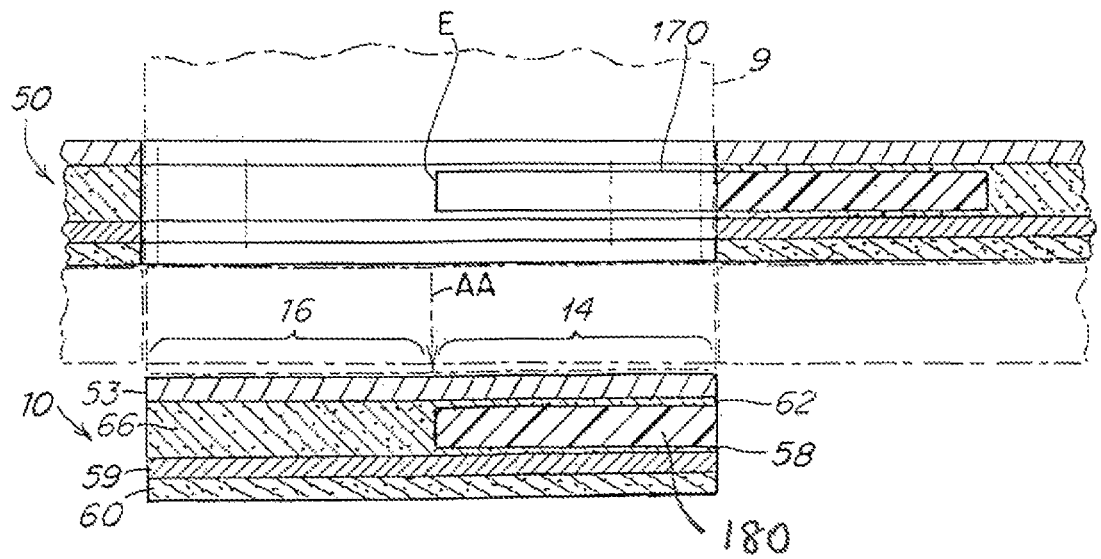
FIG. 21 illustrates a process for punching a liner disk from the laminated web of FIG. 20, such that the resulting liner includes a portion of the insert component (of FIG. 17).

FIG. 21 illustrates a process for punching a liner disk 10 from the laminated web of FIG. 20, such that the resulting liner includes a portion 180 of the insert component 170 (of FIG. 17).

Figure 22:
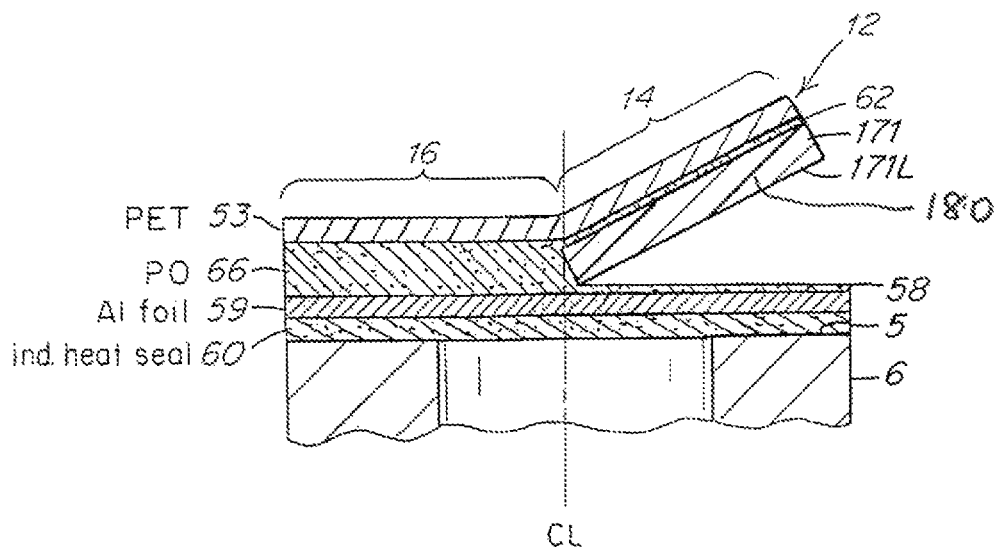
FIG. 22 is a cross sectional view showing the punched liner of FIG. 21 attached to the rim of a container by induction heat sealing; the liner having a separable tab made from the upper component and heat resistant layer of the insert that resists bonding during both the thermal lamination and the induction heat sealing processes to produce a pull tab in a second liner area, while in a first liner area, without the insert, the upper and lower multilayer components are thermally laminated with no separation (non-separable).

FIG. 22 is a cross sectional view showing the punched liner 10 of FIG. 21 attached to the rim 5 of a container 6 by induction heat sealing; the liner having a separable tab 12 made from the upper component support layer 53, the now integral polyolefin layer 62 (formed from 54 and 172) and the heat resistant insert layer 171 that resists bonding during both the thermal lamination and the induction heat sealing processes to produce a pull tab 12 in a second liner area 14, while in a first liner area 16, without the insert 180, the upper and lower multilayer components are thermally laminated (by integral polyolefin layer 66) with no separation (non-separable).

Figure 16B:
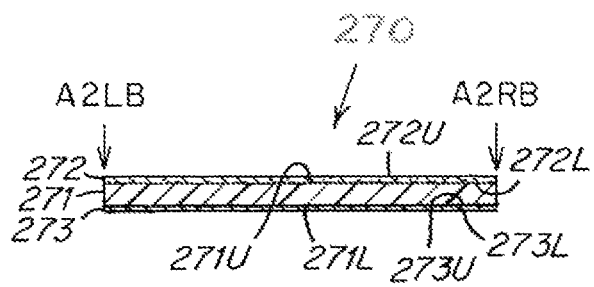

FIG. 23 is a top plan, partial cut away view of a thermally laminated web 50 according to the second embodiment, in which strips of the multi-layer non-folded insert component 170 of FIG. 16A, or alternatively 270 of FIG. 16B, are laid down in spaced apart locations parallel to the longitudinal (length) direction of the web, and showing the locations (the circles C in FIG. 23) of multiple liner disks to be punched from the web, each disk straddling a portion of the insert component 170 so as to form a separable tab in the punched liner disk.

Third Embodiment with Thermoplastic Elastomer (TPE) Layer

FIGS. 24-27 are cross sectional views showing alternative embodiments of a lower multi-layer component LSP having a TPE layer in accordance with another embodiment of the invention. This embodiment may be used alone or in combination with either of the first and second embodiments (as the lower component 56 of the web 50).

In this embodiment a thermoplastic elastomer (TPE) layer is provided in the lower component. The TPE layer provides a compressible layer which enhances the sealing effect of the liner, i.e., provides a tighter seal between the cap and bottle rim to deter ingress or egress of gas or liquid and thus enhance the sterility and/or shelf life of the stored product. Preferably the TPE comprises a polyolefin or polystyrene based TPE material, which may include other copolymers or blends. The benefits of using a TPE, in addition to providing a better seal, is the ease of manufacture and processing (e.g., the material may be recycled and extrusion or injection molded) and the elastomeric property (the ability to compress or elongate and then return to substantially near its original shape) create a longer life and better physical range of properties.

Figure 24:
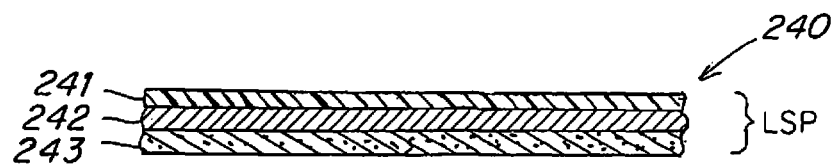
FIGS. 24-27 are cross sectional views showing alternative examples of a lower multi-layer component in accordance with another embodiment of the invention, wherein the lower component includes a thermoplastic elastomer (TPE) layer.

FIG. 24 shows a three-layer lower component 240 in which the TPE layer is the uppermost layer of the lower component, for thermal bonding to the upper component 52 in the first liner portion A1 and not bonding to the insert (70, 170, 270) in second liner portion A2. In FIG. 24 the lower component 140 includes, in serial order from top to bottom: an upper layer 241 of TPE; a middle layer 142 of aluminum foil; and a lower heat seal layer 143.

Figure 25:
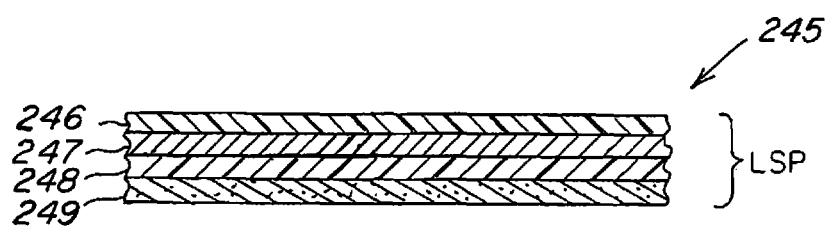

FIG. 25 shows a four layer lower component 245, similar to FIG. 24, with an uppermost TPE layer 246 but having an additional PET layer 248 between an aluminum foil layer 247 and a lowermost heat seal layer 249.

Figure 26:
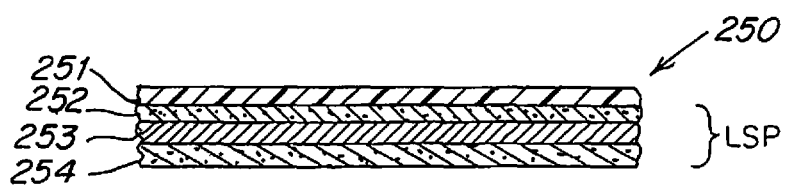

FIG. 26 shows an alternative four layer lower component 250, similar to FIG. 25, but having an additional uppermost solid (non-foam) polyolefin layer 251 above a TPE layer 252; an aluminum foil layer 253 and a heat seal layer 254 reside below the TPE layer s in FIG. 25. In this embodiment, the uppermost polyolefin layer will thermally bond to the lowermost layer 54 of the upper component 52 as in the first embodiment of FIGS. 1-15, while the TPE layer provides compressibility (without requiring a polyolefin foam layer for compressibility).

Figure 27:
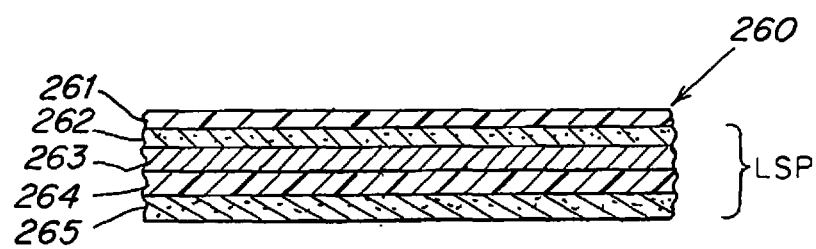

FIG. 27 shows an alternative four layer lower component 260, similar to FIGS. 25 and 26, having both an uppermost solid polyolefin layer 261 above a TPE layer 262, and a PET layer 264 between a heat seal layer 265 and an aluminum layer 263.

These and other embodiments of the invention will be apparent to the skilled person.

The invention claimed is:

1. A method of forming an induction heat sealable liner for sealing to a rim of a container, the method comprising:
   providing three separate multi-layer components comprising:
   an upper multilayer component (UMC) comprising an upper support layer and a lower heat bondable polyolefin layer; and a lower multilayer component (LMC) comprising an upper heat bondable polyolefin layer, a lowermost induction heat sealable layer for sealing to a rim of a container, and an inductive heating layer therebetween;

an insert comprising an upper heat bondable polyolefin insert layer and a lower heat resistant separable layer, stacking the three multi-layer components and thermally laminating the stacked composite to form a composite liner, wherein the method includes:

disposing a first area of the UMC and LMC heat bondable polyolefin layers facing one another, disposing the insert between a second area of the UMC and LMC heat bondable polyolefin layers such that the lower heat resistant separable layer is facing the LMC heat bondable polyolefin layer, and the UMC and insert heat bondable polyolefin layers are facing one another, and forming a non-separable first liner portion during the thermally laminating step by at least partially melting the facing UMC and LMC heat bondable polyolefin layers in the first area by application of heat and pressure to form an integral polyolefin layer in the first liner portion of the composite liner, and forming a second liner portion having a pull tab formed in the second area by at least partially melting the facing insert and UMC heat bondable polyolefin layers to form an integral polyolefin layer in the second liner portion of the composite liner; and attaching the composite liner to a container rim by induction heat sealing, wherein the heat resistant separable layer resists bonding during both the thermally laminating and the induction heat sealing to produce the pull tab in the second liner area.

2. The method of claim 1, wherein the heat bondable polyolefin layers of the composite liner are formed from at least one of an ethylene-based polymer and a propylene-based polymer.

3. The method of claim 2, wherein the ethylene-based polymer is an ethylene-alpha olefin copolymer and the propylene-based polymer is a propylene-alpha olefin copolymer.

4. The method of claim 1, wherein the heat bondable polyolefin layers are formed from at least one of ethylene vinyl acetate (EVA) based polymers, ethylene-methyl acrylate (EMA) based polymers, and ethylene-ethyl acrylate (EEA) based polymers.

5. The method of claim 1, wherein the heat bondable polyolefin layers comprise polypropylene, polyethylene, and copolymers and blends thereof.

6. The method of claim 1, wherein the insert further includes a lowermost release layer disposed adjacent the lower heat resistant separable layer wherein the release layer is facing the LMC upper heat bondable polyolefin layer in the second liner portion.

7. The method of claim 1, wherein the multilayer components are formed by one or more of extrusion, co-extrusion, extrusion coating, extrusion lamination, and dry bond lamination.

8. The method of forming the liner of claim 1, wherein the method comprises:

forming the integral polyolefin layers in the first and second liner portions in a single thermal laminating step.

9. The method of claim 1, wherein the UMC is formed, prior to the thermal laminating step, by one or more of extrusion, co-extrusion, extrusion coating, extrusion lamination, and dry bond lamination.

10. The method of claim 1, wherein the LMC is formed, prior to the thermal laminating step, by one or more of extrusion, co-extrusion, extrusion coating, extrusion lamination, and dry bond lamination.

11. The method of claim 1, wherein UMC support layer is formed from one or more of polyethylene terephthalate, polyamide, polyethylene naphthalate, polypropylene, or any combination thereof.

12. The method of claim 1, wherein the UMC and LMC heat bondable polyolefin layers are partially melted while pressing between rollers to form the integral polyolefin layer of the liner.

13. The method of claim 12, wherein at least one of the rollers is heated.

14. The method of claim 1 wherein:

at least one LMC layer comprises a thermoplastic elastomer (TPE).

15. The method of claim 14 wherein the TPE is a polyolefin or polystyrene based TPE layer.

16. The method of claim 15 wherein the polyolefin or polystyrene based TPE layer is disposed between the LMC upper heat bondable polyolefin layer and the inductive heating layer.

* * * * *